Patented July 18, 1950

2,515,482

UNITED STATES PATENT OFFICE 2,515,482

PROCESS FOR PREPARING 17-KETOSTEROIDS

Armin G. Wilson, Newark, N. J., assignor to Merck & Co., Inc., Rahway, N. J., a corporation of New Jersey No Drawing. Application March 17, 1948, Serial No. 15,499

5 Claims. (Cl. 260—397.4)

This invention relates to the synthesis of new chemical compounds and, more particularly, to the preparation of 17-ketosteroids and related compounds, intermediates useful in the synthesis of hormones of the adrenal cortex.

It has been proposed to prepare 17-ketosteroids synthetically from cyclopentano-polyhydrophenanthrene compounds which have a —COCH₃ group at the five-membered ring. The process, disclosed in the U. S. Patent No. 2,212,363 involves first the formation of an oxime which is transformed to a 17-amino compound. This 17-amino compound is reacted with sodium nitrite in the presence of acetic acid. Extraction of the reaction mixture with ether and distilling of the residue under a highly reduced pressure yields a hydroxy compound which is oxidized to the 17-ketosteroid. The disclosed process as well as similar processes described in the literature are unsatisfactory for commercial use in that they are time consuming and require many steps and highly skilled labor.

I have now found that I can prepare 17-ketosteroids directly from 20-keto compounds. In accordance with my improved method herein disclosed, 20-keto pregnanes, which may have substituents in the 3 or 11 position such as halogen, keto, hydroxy or acyloxy, are reacted with an alkyl nitrite in an alcoholic solution in the presence of a catalyst. Alkali metal alkoxide or similar basic catalysts such as alkali metal amides and hydrides may be used. Acid catalysts such as boron trifluoride and anhydrous mineral acids, such as HCl, HBr, H₂SO₄ may also be used in this process, if desired. The reaction proceeds smoothly at any temperature between 0 and 100° C. and its progress may be observed by the gradual change of color from yellow orange to orange brown. When the color remains constant the reaction is usually completed. The formed oxime may then be hydrolyzed to yield the desired 17-ketone. The hydrolysis is preferably carried out in an alcoholic solution in the presence of a mineral acid such as hydrochloric acid, sulfuric acid or the like. The formed crude 17-ketone may then be purified by recrystallization.

The following examples illustrate a method of carrying out the present invention, but it is to be understood that these examples are given by way of illustration and not of limitation.

*Example 1*

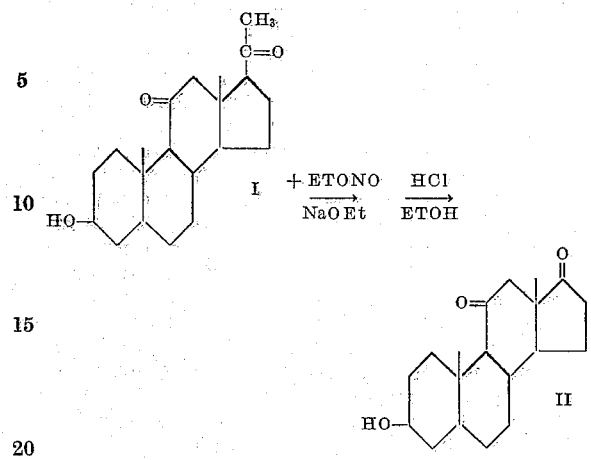

An ice-cold solution of 0.300 g. of 3-hydroxy-11,20-pregnanedione in 30 ml. of dry, absolute alcohol was combined with an ice-cold solution of 0.70 g. of clean sodium metal in 30 ml. of dry, absolute ethanol. 1.0 ml. of pure, dry ethyl nitrite was added, and the faintly yellow solution was stored in the cold room for 48 hours. The now bright yellow solution was then allowed to stand at room temperature for 5 days longer. At the end of this period the solution had become a deep orange-brown. The solution was treated with 5 g. of Dry Ice (CO₂) followed by 100 ml. of water.

The alcohol was then removed in vacuo, and the aqueous solution that remained was transferred to a separatory funnel and treated carefully with 10 ml. of concentrated HCl. The orange solution was then extracted with 4×100 ml. of ether (until no more color was removed from the aqueous layer by the ether). 60 ml. of ethanol was added to the combined ether extracts, and the ether was removed on the steam bath. 4 ml. of concentrated HCl was added to the alcoholic residue, and this solution was refluxed for 4 hours. The solution was then concentrated to a brown oil in vacuo. This oil was dissolved in ether, transferred to a separatory funnel, washed once with 5% aqueous potassium carbonate, dried, and filtered thru a pad of adsorbent material "Supercel and Nuchar." The water white filtrate was reduced to volume of 10 ml. The addition of 10 ml. of petroleum ether caused the precipitation of small, white rods, of 3-hydroxy-11,17-etiochloanedione, M. P. 180–183°. The analytical sample melted at 185.5–187.0°, wt. of product, 162 mg. (59%).

*Example 2*

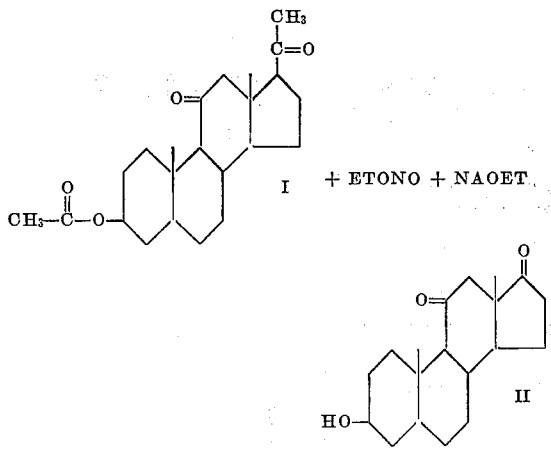

2.0 g. of 3-acetoxy-11,20-diketopregnane (M. P. 133–134°) was dissolved in 20 ml. of dry, absolute ethanol. The solution was cooled to 10° and treated with an ice-cold solution of 3.0 g. of sodium metal in 70 ml. of absolute ethanol. 1 ml. of freshly prepared ethyl nitrite was then added, and this solution was allowed to stand for 16 hours. This solution was then refluxed for 1 hr. and 15 min. on the steam bath. The solution was then chilled in ice and treated with 50 ml. of 2.5 N hydrochloric acid. The solvents were removed completely by concentration in vacuo, and the dry cake was extracted with 3–100 ml. portions of hot ethanol. The ethanolic extract was concentrated to a volume of 75 ml., and 5 ml. of concentrated sulfuric acid in 15 ml. of water was added. The solution was then refluxed for 2 hours. The alcohol was removed by concentration, and the oily material remaining was extracted with 60 ml. of chloroform in a separatory funnel. 200 ml. of ether was added, and the organic layer was washed twice with 5% aqueous potassium carbonate and once with water and dried. The chloroform-ether solution was then filtered over a pad of Nuchar and Supercel. The filtrate was concentrated to dryness. The clear glassy residue was crystallized from 4 ml. of acetone and 15 ml. of ether. Weight product 0.88 g. (54.8%) M. P. 183.8–185.3°.

Modifications may be made in carrying out the present invention without departing from the spirit and scope thereof, and the invention is to be limited only by the appended claims.

I claim:

1. The process for the preparation of 17-etiocholanones which comprises reacting 20-keto pregnanes with alkylnitrite in the presence of a catalyst selected from the group consisting of anhydrous mineral acids, boron trifluoride, alkali metal alkoxides, alkali metal amides and alkali metal hydrides and hydrolyzing the formed oxime in the presence of a mineral acid.

2. The process for the preparation of 17-etiocholanones which comprises reacting 20-keto pregnanes with ethylnitrite in the presence of alkali metal alkoxide and hydrolyzing the formed oxime in the presence of a mineral acid.

3. The process for the preparation of 3-hydroxy-11-17-etiocholanedione which comprises reacting 3-hydroxy 11,20-pregnanedione with ethylnitrite in the presence of sodium ethylate and hydrolyzing the formed oxime by boiling with a mineral acid in the presence of an alcohol.

4. The process for the preparation of 3-hydroxy-11-17-etiocholanedione which comprises reacting 3-hydroxy 11,20-pregnanedione with ethyl-nitrite in the presence of sodium ethylate and hydrolyzing the formed oxime by boiling with a mineral acid in the presence of a lower aliphatic alcohol.

5. The process for the preparation of 3-hydroxy-11-17-etiocholanedione which comprises reacting 3-hydroxy 11,20-pregnanedione with ethyl-nitrite in the presence of sodium ethylate and hydrolyzing the formed oxime by refluxing a solution of said oxime in a lower aliphatic alcohol in the presence of hydrochloric acid.

ARMIN G. WILSON.

No references cited.